United States Patent Office.

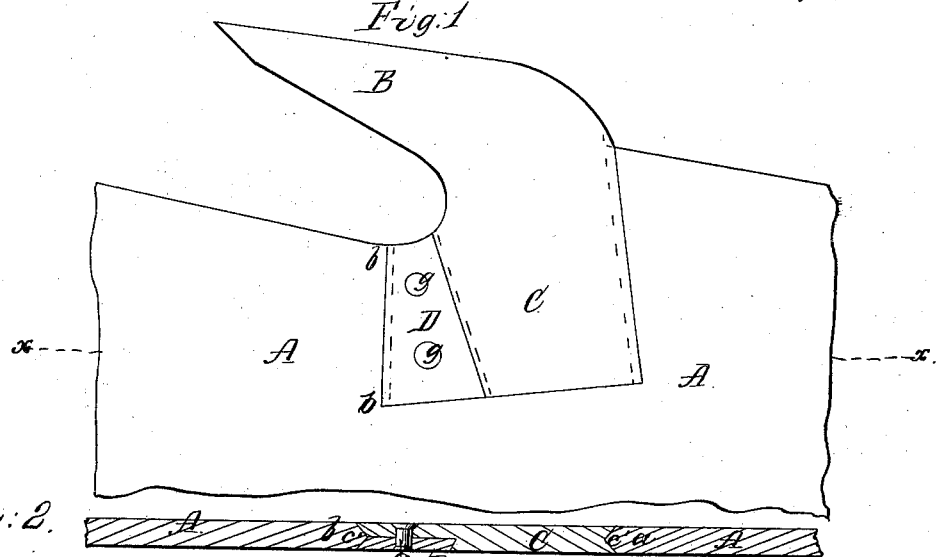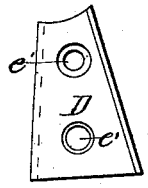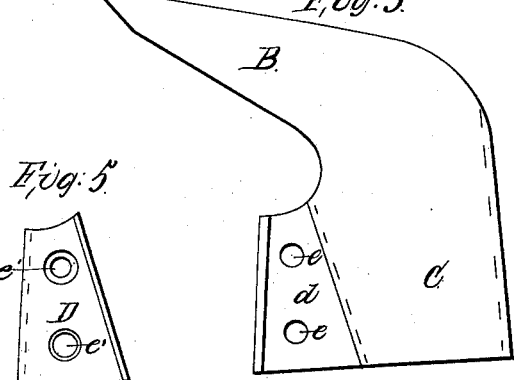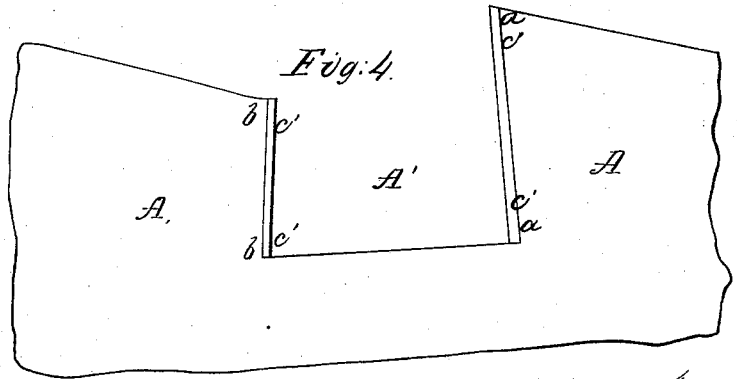

JAMES NEALE, OF TRENTON, NEW JERSEY, ASSIGNOR TO HIMSELF AND MATHEW T. HIGGINS, OF NEW YORK, N. Y.

*Letters Patent No. 65,687, dated June 11, 1867.*

---

IMPROVEMENT IN SAWS.

---

*The Schedule referred to in these Letters Patent and making part of the same.*

---

TO ALL WHOM IT MAY CONCERN:

Be it known that I, JAMES NEALE, of Trenton, in the county of Mercer, and State of New Jersey, have invented a new and useful Improvement in Detachable Saw-Teeth; and I do hereby declare that the following is a full, clear, and exact description of the same, reference being had to the accompanying drawings, making a part of this specification, in which—

Figure 1 is a side view of a portion of a saw having its teeth attached according to my invention.

Figure 2 is a transverse section of the same taken in the line $x\,x$, of fig. 1.

Figure 3 is a detached side view of the tooth alone.

Figure 4 is a detached side view of a portion of the plate or body of the saw.

Figure 5 is a detached side view of a clamping piece employed in securing the tooth to the saw-plate.

Similar letters of reference indicate corresponding parts in all the figures.

This invention consists in a novel means of attaching the teeth of a saw to the body or plate thereof, whereby the teeth are very firmly held in their places and at the same time rendered easily detachable when desired.

To enable others to understand the nature and construction of my invention, I will proceed to describe it with reference to the drawings.

A represents the saw-plate of a reciprocating saw, such as is employed in saw-mills for cutting logs into boards or timbers. Formed at suitable distances apart in the front edge of this plate A are any desired number of recesses or sockets, of which one is shown in fig. 4, at A', in which the teeth are secured as will be presently set forth. The front edge of the saw-plate is of such shape or configuration that it projects outward considerably farther at the rearmost side $a$ of each socket A', than at the foremost end $b$ of such socket, as represented in figs. 1 and 4. The saw-plate at the said rear and forward ends of each socket is bevelled at each side, or in other words made V-shaped in its cross-section, as shown at C', in figs. 2 and 4, while the bottom of the said recess or socket is made flat. The recess or socket A' is made larger at its bottom than it is at the edge of the plate A, so that a dove-tail form is given to the said socket. B C represent one of the teeth, the outer or cutting portion B of which is of any suitable shape, and the inner part or base C of which corresponds in shape with the socket A', into which it is fitted. There is a V-shaped groove formed longitudinally in the rearmost edge of the said base C of the tooth, and one side of the foremost portion of the said base is cut away, as shown more clearly at $d$, in fig. 3, while the edge of the remaining portion of the said foremost part of the base is bevelled to fit one side of the V-shaped end $b$, of the socket A'. D is a flat clamping-piece, which is of the same shape and size as the recess formed by cutting away the foremost part of the base A', at $d$, as just set forth. Two holes $e$ are formed transversely in the remaining portion of the said foremost part of the base, and two corresponding holes $e'$ are formed transversely in the clamping-piece D, in such manner that when the several parts are placed in proper position they will be securely held together by rivets passing through the said holes, as will be presently fully set forth. The V-shaped edge $c'$, at the rearmost end $a$ of the socket A', is placed in the V-shaped groove formed in the rearmost end of the base of the tooth, and the foremost end of the said base is pressed inward until the bevelled edge thereof is brought in contact with the side of the V-shaped edge $c'$ of the foremost end $b$ of the socket. The clamping-piece D is then fitted into the recess formed by cutting away the base C, with its bevelled forward edge resting against the opposite side of the V-shaped edge $e'$ of the end $b$, and with its rearmost edge fitted closely to the shoulder formed at the rearmost edge of the recess $d$, as shown at $f'$ in fig. 2, the said shoulder being placed at an acute angle to the flat bottom of the said recess $d$, as represented in the said fig. 2. The holes $e'$ in the clamping-piece D being brought opposite the holes $e$ in the saw-plate, rivets $g$ of suitable size are passed through the said holes and headed at each end, thus firmly securing the clamping-piece to the base of the tooth, and causing the V-shaped edge of the end $b$ of the socket to be clamped between the foremost edge of the said clamping-piece, and that of the opposite part of the base of the tooth in the same manner, that the V-shaped edge of the rearmost end $a$ of the socket is confined V-shaped groove in the rearmost edge of the base C, thus firmly holding the tooth against lateral displacement at the same time that the dove-tail shape of the socket prevents it from being drawn out therefrom. By this means the teeth of the saw are rigidly secured to the saw-plate, and may also be readily detached therefrom when desired, and, inasmuch as no rivet holes are made in the said plate, all liability of "buckling" the same by the expansion of the rivets in heading them is avoided.

I do not claim a saw-tooth secured by a lapping plate introduced into an opening in the saw-plate below the tooth, as this has before been used, as found in Patent No. 55,375, but it only acts to prevent the tooth sliding out from the notch into which it is introduced, and does not act as a clamp.

What I claim, and desire to secure by Letters Patent, is—

A saw-tooth formed with a dove-tailed base and grooved back setting within the recess of the saw-plate, and secured by the clamping-plate D within a recess at the front portion of the base of the tooth, in the manner set forth.

JAMES NEALE.

Witnesses:
A. LE CLERC,
J. W. COOMBS.